United States Patent
Schieke et al.

(10) Patent No.: US 11,992,888 B2
(45) Date of Patent: May 28, 2024

(54) TOOL FOR CUTTING TEETH OR FOR DRESSING OF A FINE MACHINING TOOL HAVING A SET OF EXTERNAL TEETH

(71) Applicant: Prawema Antriebstechnik GmbH, Eschwege/Werra (DE)

(72) Inventors: Jörg Schieke, Erfurt-Marbach (DE); Walter Holderbein, Eschwege (DE)

(73) Assignee: Präwema Antriebstechnik GmbH, Eschwege/Werra (DE)

(*) Notice: Subject to any disclaimer, the term of this patent is extended or adjusted under 35 U.S.C. 154(b) by 1276 days.

(21) Appl. No.: 16/489,461

(22) PCT Filed: Mar. 6, 2018

(86) PCT No.: PCT/EP2018/055476
§ 371 (c)(1),
(2) Date: Aug. 28, 2019

(87) PCT Pub. No.: WO2018/162484
PCT Pub. Date: Sep. 13, 2018

(65) Prior Publication Data
US 2020/0047269 A1    Feb. 13, 2020

(30) Foreign Application Priority Data
Mar. 6, 2017 (DE) .................. 10 2017 104 625.9

(51) Int. Cl.
*B23F 21/28* (2006.01)
*B23F 19/05* (2006.01)
(Continued)

(52) U.S. Cl.
CPC .......... *B23F 21/286* (2013.01); *B23F 19/057* (2013.01); *B23F 23/1231* (2013.01); *B24B 53/075* (2013.01); *B23F 19/05* (2013.01)

(58) Field of Classification Search
CPC .. B23F 21/286; B23F 19/057; B23F 23/1231; B23F 19/063; B23F 21/03; B23F 19/05;
(Continued)

(56) References Cited

U.S. PATENT DOCUMENTS 1,924,380 A * 8/1933 Rideout .................. B23F 21/00
                                                                    105/132
2,228,968 A * 1/1941 Miller .................... B23F 21/286
                                                                    407/31
(Continued)

FOREIGN PATENT DOCUMENTS

CN    1294543 A    5/2001
DE    2719524 A1   12/1977
(Continued)

OTHER PUBLICATIONS

Yuan, "Gear Cutter Design", National Defense Industry Press, 2014, p. 123—Cited and relevance discussed in CN office action as Public Knowledge Evidence.

*Primary Examiner* — Sara Addisu
(74) *Attorney, Agent, or Firm* — The Webb Law Firm

(57) ABSTRACT

The invention relates to a tool for dressing or cutting teeth of fine machining tools, which tool makes it possible to exactly reproduce, in a simple manner, the required tooth system geometry on the fine machining tool which is to be dressed or in which teeth are to be cut. The tool is annular and has a set of internal teeth, the teeth of which mesh, during the tooth-cutting or dressing operation, with the set of external teeth of the fine machining tool in which teeth are to be cut or which is to be dressed. At the same time, the tool has a central longitudinal axis, which extends through the centre point of the opening surrounded by the tool. According to the invention, the set of internal teeth is now formed on a ring element, which is at most 5 mm thick and is produced from a diamond material. The teeth of the set of (Continued)

internal teeth have cutting edges, by means of which said teeth remove material of the fine tool during the tooth-cutting or dressing machining process. The ring element is supported by a support ring, on which at least one support element associated with the support ring opening of the support ring is provided. The ring element is supported on said support element. The teeth of the set of internal teeth formed on the ring element protrude beyond the edge of the support element facing the support ring opening at least over part of the length of the cutting edges of said teeth in the direction of the central longitudinal axis of the tool.

9 Claims, 2 Drawing Sheets

(51) Int. Cl.
*B23F 23/12* (2006.01)
*B24B 53/075* (2006.01)

(58) Field of Classification Search
CPC ........ B23F 19/055; B23F 23/006; B23F 9/00; B24B 33/08; B24B 53/075; Y10T 409/109222; Y10T 409/40; Y10T 409/107632
See application file for complete search history.

(56) References Cited

U.S. PATENT DOCUMENTS

| | | | | |
|---|---|---|---|---|
| 2,665,472 A * | 1/1954 | Aschwanden | ........ | B23F 21/226 407/22 |
| 3,147,535 A | 9/1964 | Wildhaber | | |
| 3,247,301 A * | 4/1966 | Praeg | ...................... | B23F 21/03 264/225 |
| 6,273,801 B1 * | 8/2001 | Rappold | ................ | B24D 18/00 451/540 |
| 6,510,762 B1 | 1/2003 | Beier et al. | | |
| 6,939,214 B2 * | 9/2005 | Vogel | ...................... | B23F 21/03 451/508 |
| 2020/0047269 A1 | 2/2020 | Schieke et al. | | |
| 2022/0314350 A1 * | 10/2022 | Schieke | ................ | B24B 53/075 |

FOREIGN PATENT DOCUMENTS

| | | | | |
|---|---|---|---|---|
| DE | 19703261 A1 * | 8/1998 | ............. | B23F 21/03 |
| EP | 2036675 A2 | 3/2009 | | |
| EP | 3592492 A1 | 1/2020 | | |
| EP | 3760369 A1 * | 1/2021 | ............ | B23F 19/057 |
| JP | S52140097 | 11/1977 | | |
| JP | 61030322 A * | 7/1984 | | |
| JP | 6016319 A | 1/1985 | | |
| JP | 04365513 A * | 6/1991 | | |
| JP | 7124820 A | 5/1995 | | |
| JP | 07214423 A * | 8/1995 | ............ | B23F 19/057 |
| JP | H1158134 A | 3/1999 | | |
| JP | 11138346 A * | 5/1999 | ............. | B23F 19/05 |
| JP | 2008044021 A * | 2/2008 | ............. | B23F 21/02 |
| KR | 1020010023013 A | 3/2001 | | |
| WO | WO-9924203 A1 * | 5/1999 | ............. | B23F 21/03 |
| WO | 9948646 A1 | 9/1999 | | |
| WO | WO-2008018505 A1 * | 2/2008 | ............. | B23F 21/02 |
| WO | 2008156078 A1 | 12/2008 | | |
| WO | 2011157830 A1 | 12/2011 | | |
| WO | 2012159942 A1 | 11/2012 | | |

* cited by examiner

TOOL FOR CUTTING TEETH OR FOR DRESSING OF A FINE MACHINING TOOL HAVING A SET OF EXTERNAL TEETH

CROSS-REFERENCE TO RELATED APPLICATIONS

This application is the United States national phase of International Application No. PCT/EP2018/055476 filed Mar. 6, 2018, and claims priority to German Patent Application No. 10 2017 104 625.9 filed Mar. 6, 2017, the disclosures of which are hereby incorporated by reference in their entirety.

BACKGROUND OF THE INVENTION

Field of the Invention

The invention relates to a tool for cutting teeth or dressing of a fine machining tool having a set of external teeth for the fine-machining of workpieces.

To this end a tool of the kind referred to here has an annular configuration and has a set of internal teeth, the teeth of which mesh during machining with the set of external teeth of the fine machining tool in which teeth are to be cut or which is to be dressed. In the process, the tool rotates during machining about a longitudinal axis running through the centre point of the opening surrounded by the tool.

The fine machining tools to be dressed or profiled by means of a tool according to the invention are used, by way of example, for finish grinding or honing of workpieces, which in turn typically involves toothed wheels, toothed racks or similar components.

Description of Related Art

Normally, the fine machining tools involved here are produced as ceramic- or resin-bonded tools, on which a tooth system is reproduced, the design of which corresponds to the tooth system to be machined. In the course of the respective fine machining the fine machining tool experiences wear. To ensure that the form elements, e.g. by way of example a tooth system, to be generated on the workpiece to be machined via the machining process, have the required precision, the fine machining tools must therefore be dressed every so often. As a result of the dressing process, the fine machining tool is brought into a state in which optimum precision of the machining results with a simultaneously high removal rate is ensured.

However, use of the tools of the kind referred to here is not just restricted to the repeated dressing of fine machining tools provided with a corresponding tooth system geometry. Rather, they can also serve for providing unused fine machining tools, which are provided in the delivered state with just a coarse set of teeth, with the tooth system profile needed for the respective fine machining task for which they are intended. In this process, also referred to as "profiling", by means of the tool the respective tooth system geometry required is incorporated into the coarse tooth system of the new fine machining tool.

For the dressing or profiling of the fine machining tools, tools are normally used in which the profile of the tool to be dressed has been incorporated. Form elements can also be incorporated into the tool which are needed to generate any required geometrical changes on the tool to be dressed.

In the course of the dressing or tooth cutting process, the tool and the fine machining tool to be dressed or profiled are normally brought into engagement and the profile or the geometry of the tool is transferred to the fine machining tool to be dressed.

As an alternative to this conventional process, in EP 2036675 B1 a tool is proposed for dressing fine machining tools, on which a dressing gear is provided with a tooth system geometry, in which at least the teeth are made from a diamond material, wherein the thickness of the dressing gear in the vicinity of the tooth system meshing with the tool to be dressed is substantially lower than the thickness of the respective tooth to be machined of the fine machining tool. Specifically, the thickness of the dressing gear is limited to a maximum of 1.2 mm. The low thickness of the dressing gear and the properties of the diamond material allow the dressing gear in the course of the dressing process, with the dressing gear meshed with the fine machining tool to be dressed, irrespective of the shape of the respective teeth to be machined, to be moved in an as far as possible freely-controllable manner along the tooth flanks of the tool to be dressed. This means that the dressing itself does not have the tooth system geometry to be configured on the fine machining tool. Instead, this is generated by a corresponding control of the dressing gear during the dressing machining. In this way, in tools provided with straight or inclined tooth systems or otherwise complex-shaped tooth systems, the necessary helix angle or the respective tooth shape to be configured can be determined solely by the movement, which the dressing gear performs on its way along the tooth flank of the respective tooth with which it is meshed.

The method described in WO 2011/157830 A1 for profiling a honing tool for the honing of a tooth system of a workpiece is also based on the use of a profiling tool with a thickness which is substantially lower than the thickness of the respective tooth system to be profiled. In this method, an annular, unfinished profiled honing tool is clamped in a holder of a honing machine intended for holding the honing tool during the honing machining and a profiling tool in the workpiece spindle of the honing machine.

Here, the profiling tool is configured as a narrow, disc-shaped, toothed wheel, the thickness of which, referred to as such for the purposes of the present text and measured axis-parallel to the central longitudinal axis of the profiling tool, is lower than the width of the tooth system profile to be generated on the honing tool. The profiling tool designed in this way and the honing tool to be profiled are then moved relative to one another, such that the profiling tool meshes with the honing tool and reproduces on the honing tool the tooth system profile necessary for the honing machining of the tooth system of the workpiece, wherein the narrow profiling tool for generating the flank line of the teeth of the honing tool to be profiled is guided during profile machining in the direction of the workpiece axis (Z-direction).

In both the published patents described above, EP 2036675 B1 and WO 2011/157830 A1, respective exemplary embodiments for dressing or profiling tools are proposed, which are provided with a set of external teeth.

Against this background, the object arose of providing a tool for dressing or cutting teeth of fine machining tools, provided with a set of internal teeth and which in a simple manner enables an exact reproduction of the respective tool geometry required on the fine machining tool which is to be dressed or in which teeth are to be cut.

A tool according to the invention for cutting teeth or dressing of a fine machining tool having a set of external teeth for the fine machining of workpieces, accordingly and as mentioned above, in the prior art of known tools of this kind has an annular configuration and a set of internal teeth, the teeth of which mesh, during the tooth-cutting or dressing operation with the set of external teeth of the fine machining tool in which teeth are to be cut or which is to be dressed, wherein the tool has a central longitudinal axis which runs through the centre point of the opening surrounded by the tool.

SUMMARY OF THE INVENTION

According to the invention, the set of internal teeth is now configured on a ring element, made from a diamond material, the thickness of which measured parallel to the central longitudinal axis is a maximum of 5 mm, wherein the teeth of the set of internal teeth have cutting edges, with which during the tooth-cutting or dressing machining they remove material from the fine machining tool, and wherein the ring element is supported by a support ring, on which at least one support element associated with the support ring opening of the support ring is provided, on which the ring element is supported and beyond which the edge of the teeth of the set of internal teeth configured on the ring element facing the carrier ring opening protrude over at least part of the length of their cutting edges in the direction of the central longitudinal axis of the tool.

Thus the invention takes the design described in EP 2036675 B1 and WO 2011/157830 A1 of dressing and tooth-cutting tools and, from these, designs a tool according to the invention such that it can reliably support the thin ring element comprising a diamond material and forming its set of internal teeth. To this end, on the support ring provided according to the invention a support element is provided, which supports the ring element with its set of internal teeth such that it is held securely, but the teeth of the set of internal teeth protrude freely into the ring opening surrounding the support ring with the ring element, so that they can freely mesh with the material of the fine machining tool to be machined.

As with the prior art described in EP 2036675 B1 and WO 2011/157830 A1, in this way the tool according to the invention also allows the tooth system geometry to be generated in the respectively machined fine machining tool to be reproduced simply by a suitable movement of the tool.

To this end, the ring element according to the invention provided with the set of internal teeth, and made from a diamond material, is as thin as possible. This means that it has the lowest possible thickness, so that it is formed like a knife blade. Accordingly, the thickness of the ring element measured parallel to the central longitudinal axis is a maximum of 5 mm, wherein lower thicknesses of a maximum of 4.5 mm, a maximum of 4 mm or a maximum of 3.5 mm have proven particularly advantageous.

Further parameters and other influencing variables to be borne in mind when producing the ring element have essentially already been described in EP 2036675 B1 and WO 2011/157830 A1, for which reason the contents of EP 2036675 B1 and WO 2011/157830 A1 are hereby included in this application by reference.

According to an embodiment of a tool according to the invention, considerably simplified with regard to the production and assembly, the ring element comprising the diamond material is composed of ring segments, which in each case extend beyond a portion of the circumference of the ring element. The ring segments can have any suitable shape that allows a simple securing to the support ring. The most important aspect is that the teeth configured on them, when the ring element is completely assembled from the ring segments, together form the set of internal teeth, representing the tooth system geometry to be configured on the workpiece to be machined. A simple design of the support ring or of the support element provided on it results here if the ring segments have an arched configuration, and thus coincide with a partial circle of the circle coinciding with the ring element.

In a segmented implementation of the ring element, the production of the individual ring segments can be simplified if the ring segments are identical in shape. With an arched design of the ring segments they are also each able to extend over the same angular range.

Basically, with a segmented implementation of the ring element it is possible to arrange the individual segments spaced apart from one another in the circumferential direction provided that, together, the teeth present on them form the proper set of internal teeth. However, a secure and precise positioning of the ring segments can be ensured in a simple manner in that ring segments arranged adjacently fit tightly against each other with their reciprocal lateral surfaces.

In order not to disturb the geometry of the teeth in the set of internal teeth of a tool according to the invention in a segmented implementation of the ring element, the joint present between adjacently arranged ring segments can in each case be arranged in the region of a tooth gap present between two adjacent teeth of the set of internal teeth.

The support element provided on a tool according to the invention ensures that during the machining operation the delicate ring element is supported on the support ring in such a way that it can safely withstand the forces impinging on it. To this end, it has proven advantageous if the support element, on which the ring element having the set of internal teeth is supported, is configured as a shoulder surrounding the support ring opening.

The support element can be secured as a separately produced and suitable support element on the support ring. Here, the support element can already be fitted with the ring element during assembly. However, alternatively, the support element can also be configured as a single piece with the support ring. To this end, by way of example in the support ring configured as a single piece with the support element a suitable shoulder can be formed as the support element.

The support ring can comprise any suitable material, the mechanical properties of which are consistent with the loads occurring during machining operations. Suitable materials here are in particular the steel materials known for these purposes in the prior art.

In particular, the materials mentioned in EP 2036675 B1 and WO 2011/157830 A1 can be considered for the diamond material of the ring element.

The ring element or its ring segments can be retained on the support in any suitable manner. Such retention can be achieved particularly economically by bonding the ring element or its segments to the support element, in particular by gluing to the support element. Alternatively, or additionally, the ring element or its ring segments can also be mechanically coupled to the support element by a frictional connection. A good way of achieving this is, if necessary, clamping using clamping elements braced against the support element or the support ring.

Alternatively, or additionally, to securing to the support element the ring element or its segments can also be connected in the manner described above to the support ring, should this prove to be expedient.

BRIEF DESCRIPTION OF THE DRAWINGS

In the following, the invention is explained in more detail by means of a drawing showing an exemplary embodiment. The figures of this show schematically as follows.

DESCRIPTION OF THE INVENTION

Figure 2:
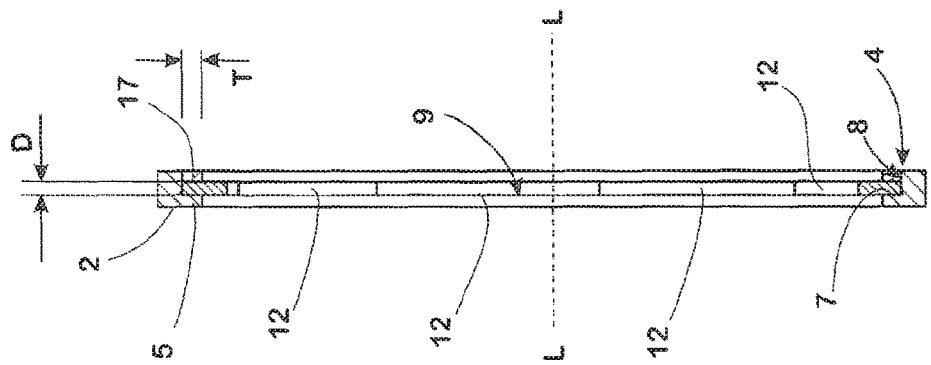
FIG. 2 the tool according to FIG. 1 in cross section along the line of intersection A-A marked in FIG. 1.
Figure 1:
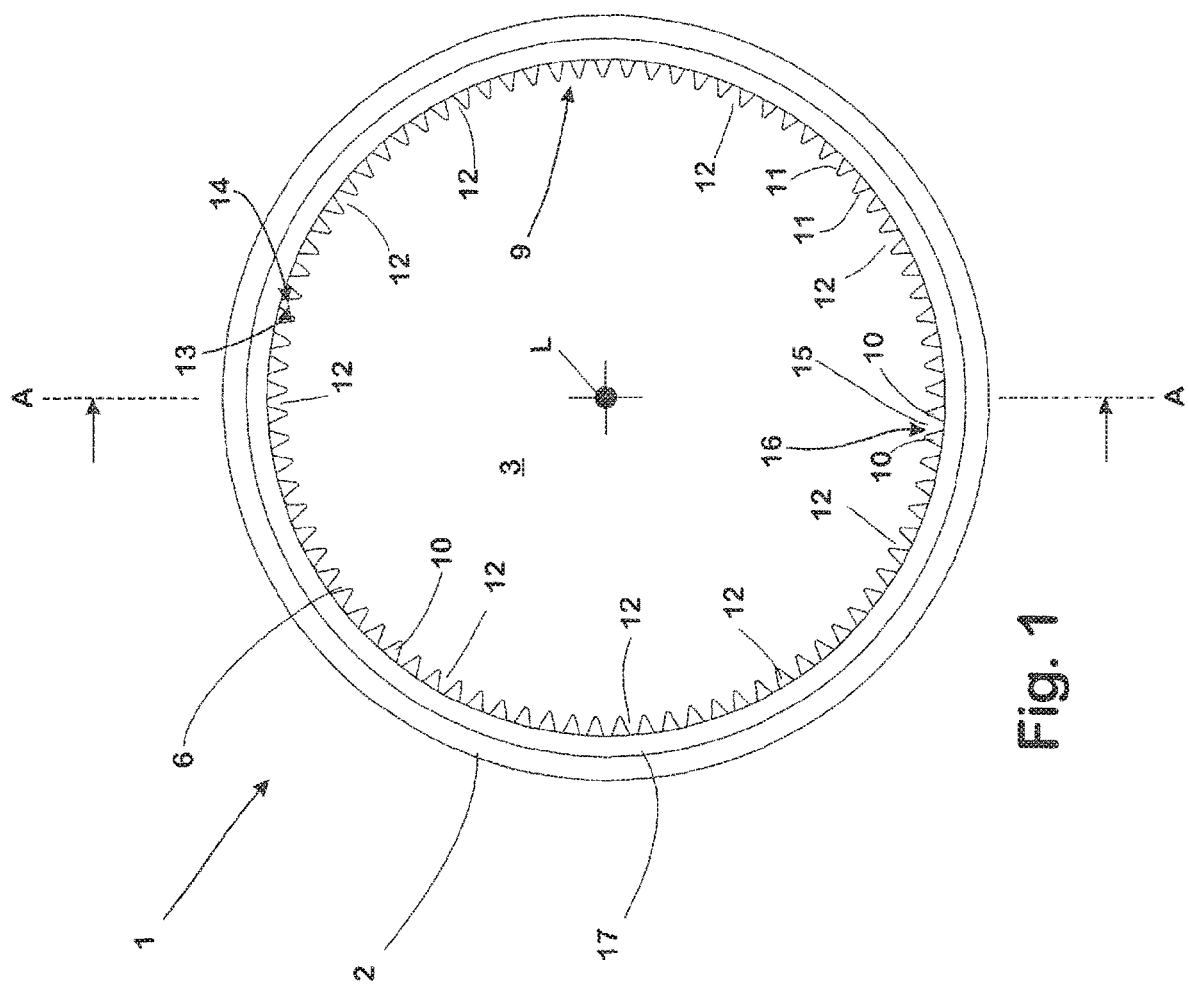
FIG. 1 a frontal view of a tool for dressing or cutting teeth of a honing machining tool with a set of external teeth.
Figure 3:
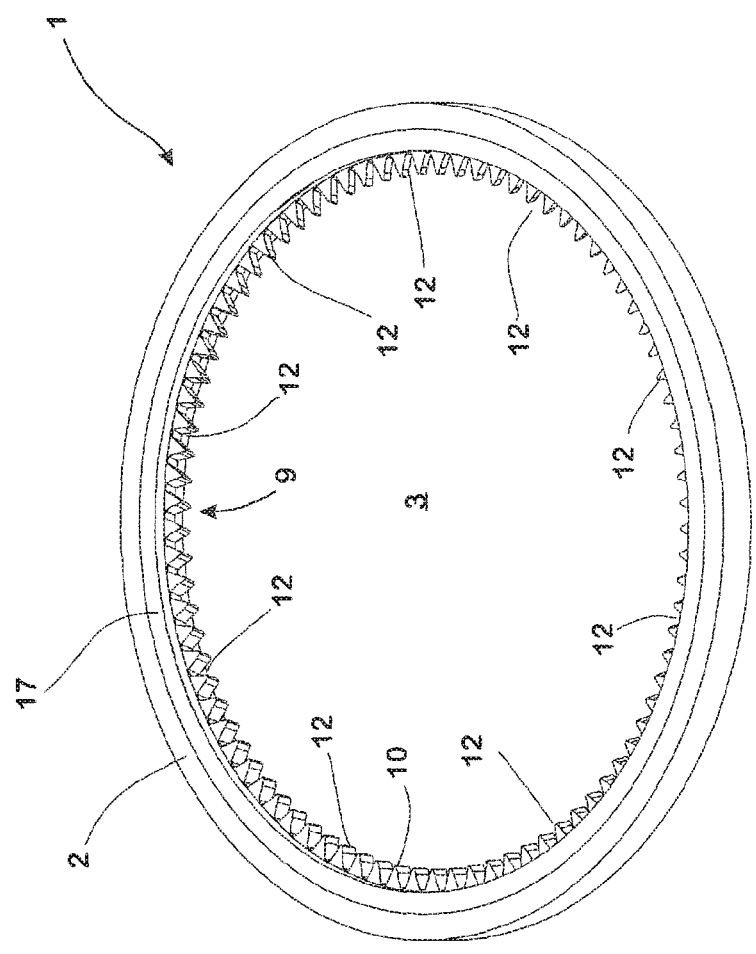
FIG. 3 the tool in a perspective view from above.

The tool 1 comprises a support ring 2 made from a suitable steel material, surrounding a central longitudinal axis L and defining a support ring opening 3. Here, the central longitudinal axis L is aligned concentrically to the support ring opening 3.

In the periphery associated with the support ring opening 3, starting from one front side 4 of the support ring 2 a circumferential shoulder is formed. This circumferential shoulder forms a support element 5 for a ring element 6 in a single piece with the support ring 2, which sits on the shoulder surface 7 of the support element 5 normally aligned with the longitudinal axis L and at the same time fits tightly against the inner circumferential surface 8 of the support ring 2 facing towards the support element 5. In this way, the ring element 6 is retained by a bonded connection within the support ring 2. Here, the durable firm seating of the ring element 6 in the support ring 2 is ensured by gluing the support ring 2 to the shoulder surface 7 of the support element 5.

In addition, away from the front side 4 a clamping ring 17 is placed on the ring element 6, to ensure retention of the ring element 6 by a clamping effect as well.

On its inner circumference associated with the support ring opening 3, the ring element 6 has a set of internal teeth 9, consisting of teeth 10 distributed at equal angular distances around the centre of the ring element 6. Here, the depth T of the shoulder surface 7 should be dimensioned such that the teeth 10 of the set of internal teeth 9 protrude freely beyond the edge of the support element 5 facing the support ring opening 3.

On their tooth flanks, and possibly also on their tooth tip, the teeth 10 each have a cutting edge 11, with which they remove material during machining from the honing tool to be machined (not shown here).

This is possible because at 3.2 mm, the thickness D of the ring element 6 measured parallel to the longitudinal axis L, is significantly less than the thickness of the teeth of the set of external teeth of the honing tool to be machined.

The ring element 6 is made up of nine arched ring segments 12 each with an identical design and extending in each case across a ninth of the ring circumference covered by the ring element 6. Here, the ring segments 12 are formed and dimensioned in such a way that adjacent ring segments 12 each fit tightly against each other with their narrow sides 13, 14 that face each other. Here, the joints 15 present between the ring segments 12 are in each case arranged in the region of a tooth gap 16 between two adjacent teeth 10 and accordingly do not disturb the tooth geometry.

The diamond material of the ring segment 6 is, by way of example, synthetic diamond, applied as a layer of cutting material to a substrate preferably comprising a hard metal material.

The specific production of the ring segment 6 takes place in the manner known in and of itself and described in each case in EP 2036675 B1 and WO 2011/157830 A1.

Thus, the invention provides a tool 1 for dressing or cutting teeth of fine machining tools, which tool makes it possible to exactly reproduce, in a simple manner, the required tooth system geometry on the fine machining tool which is to be dressed or in which teeth are to be cut. Here, the tool 1 is annular and has a set of internal teeth 9, the teeth 10 of which mesh, during the tooth-cutting or dressing operation, with the set of external teeth of the fine machining tool in which teeth are to be cut or which is to be dressed. At the same time, the tool 1 has a central longitudinal axis L, which extends through the centre point of the opening 3 surrounded by the tool.

According to the invention, the set of internal teeth 9 is now formed on a ring element 6, which is at most 5 mm thick and is produced from a diamond material. The teeth 10 of the set of internal teeth 9 have cutting edges 11, by means of which said teeth remove material of the fine tool during the tooth-cutting or dressing machining process. The ring element 6 is supported by a support ring 2, on which at least one support element 5 associated with the support ring opening 3 of the support ring 2 is provided. The ring element 6 is supported on said support element 5. The teeth 10 of the set of internal teeth 9 formed on the ring element 6 protrude beyond the edge of the support element 5 facing the support ring opening 3 at least over part of the length of the cutting edges 11 of said teeth in the direction of the central longitudinal axis L of the tool 1.

REFERENCE SIGNS

1 Tool for cutting teeth or dressing a fine machining tool (honing tool)
2 Support ring
3 Support ring opening
4 Front side of the support ring 2
5 Support element (circumferential shoulder)
6 Ring element
7 Shoulder surface of the support element 5
8 Inner circumferential surface 8 of the support ring 2 facing the support element 5
9 Set of internal teeth of the ring element 6
10 Teeth of the set of internal teeth 9
11 Cutting edges of the teeth 10
12 Ring segments
13,14 Narrow sides of the ring segments
15 Joints between the ring segments 13,14
16 Tooth gaps between two adjacent teeth 10
17 Clamping ring
D Thickness of the ring element 6
L Central longitudinal axis of the tool 1
T Depth of the shoulder surface 7

The invention claimed is:

1. A tool for cutting teeth or dressing of a fine machining tool having a set of external teeth for the fine-machining of workpieces, wherein the tool is annular and has a set of internal teeth, the teeth of which mesh, during the tooth-cutting or dressing operation, with the set of external teeth of the fine machining tool in which teeth are to be cut or which is to be dressed, and wherein the tool has a central longitudinal axis, which extends through the center point of the opening surrounded by the tool, characterised in that the set of internal teeth is formed on a ring element, made from a diamond material, the thickness of which measured parallel to the central longitudinal axis is a maximum of 5 mm, in that the teeth of the set of internal teeth have cutting edges, by means of which said teeth remove material of the fine tool during the tooth-cutting or dressing machining process, and in that the ring element is supported by a support ring, on which at least one support element associated with the support ring opening of the support ring is provided, the ring element being supported on said support element and the teeth of the set of internal teeth formed on the ring element protruding beyond the edge of the support element facing the support ring opening at least over part of the length of the cutting edges of said teeth in the direction of the central longitudinal axis of the tool.

2. The tool according to claim 1, characterised in that its ring element consisting of diamond material is made up of ring segments, which in each case extend across a section of the circumference of the ring element.

3. The tool according to claim 2, characterised in that the ring segments are identical in shape.

4. The tool according to claim 2, characterised in that adjacently arranged ring segments fit tightly against each other with their reciprocal lateral surfaces.

5. The tool according to claim 2, characterised in that a joint present between adjacently arranged ring segments is in each case arranged in the region of a tooth gap present between two adjacent teeth of the set of internal teeth.

6. The tool according to claim 1, characterised in that the support element, on which the ring element having the set of internal teeth is supported, is configured as a shoulder surrounding the support ring opening.

7. The tool according to claim 6, characterised in that the support element and the support ring are produced as a single piece.

8. The tool according to claim 1, characterised in that the ring element having the set of internal teeth has a bonded connection with the support element.

9. The tool according to claim 1, characterised in that the ring element having the set of internal teeth has a frictional connection with the support element.

* * * * *